Dec. 5, 1950 K. SCHLESINGER 2,532,339
CATHODE-RAY TUBE RECEIVING SYSTEM
Filed May 9, 1946 2 Sheets-Sheet 1
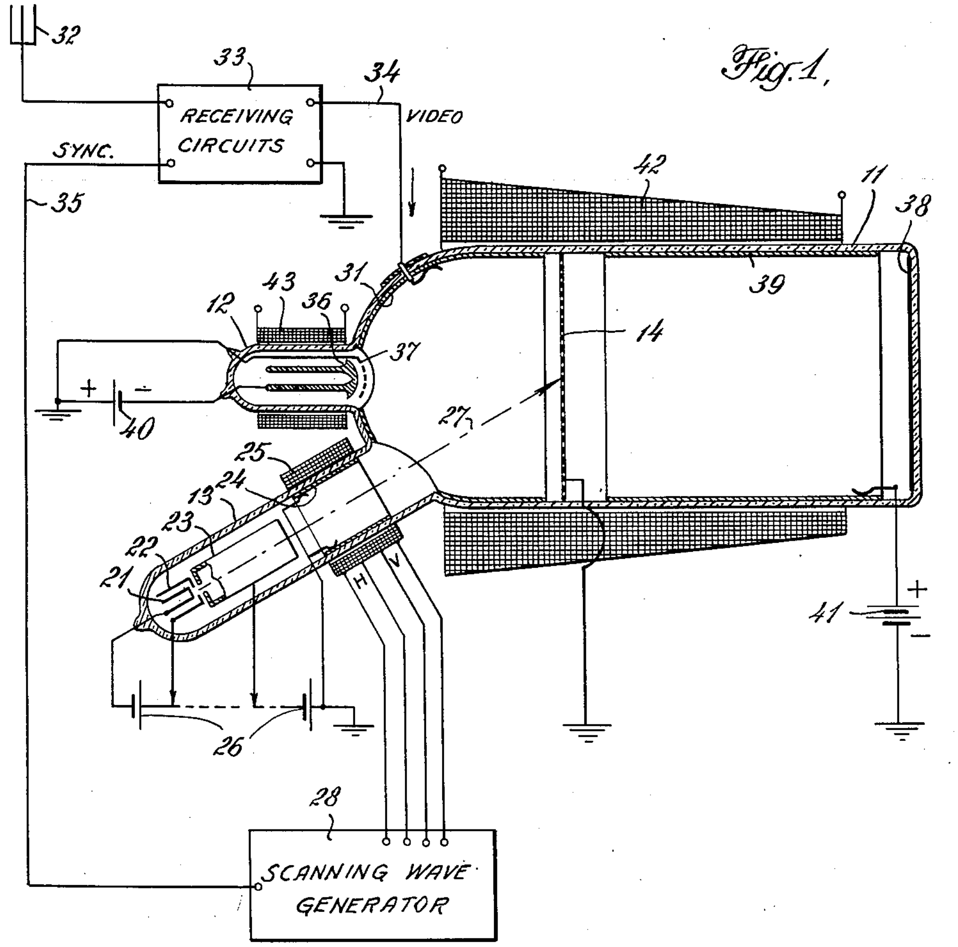
Fig. 1,
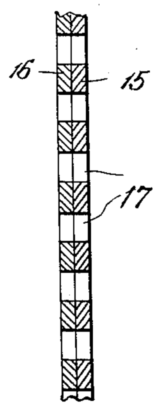
Fig. 2,
Fig. 3,
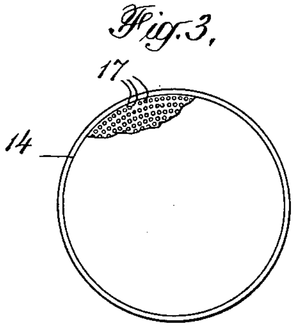
INVENTOR
KURT SCHLESINGER
BY
Pennie, Edmonds, Morton & Barrows
ATTORNEYS Dec. 5, 1950 K. SCHLESINGER 2,532,339

CATHODE-RAY TUBE RECEIVING SYSTEM

Filed May 9, 1946 2 Sheets-Sheet 2

INVENTOR
KURT SCHLESINGER
BY
Pennie, Edmonds, Morton & Barrows
ATTORNEYS

Patented Dec. 5, 1950 2,532,339

UNITED STATES PATENT OFFICE 2,532,339

CATHODE-RAY TUBE RECEIVING SYSTEM

Kurt Schlesinger, New York, N. Y., assignor to Columbia Broadcasting System, Inc., New York, N. Y., a corporation of New York Application May 9, 1946, Serial No. 668,453

19 Claims. (Cl. 315—13)

This invention relates to cathode-ray tube signal reproducing systems of the storage type. The invention is especially useful for television receivers and is particularly adapted therefor, but may also be employed in the reproduction of signals for other purposes.

In conventional cathode-ray tubes heretofore utilized in television receivers, all the power available to produce screen illumination is concentrated in a single scanning beam of elemental cross section. The beam is commonly deflected in two dimensions to scan a luminescent screen and reproduce an image thereon point by point. To secure adequate light, particularly in projection type receiver tubes, scanning beams of very high power densities are employed—of the order of several kilowatts per square millimeter. Under such heavy loads, the luminescent screen material approaches saturation and its light output efficiency is markedly impaired.

Storage type cathode-ray receiver tube systems have therefore been proposed to overcome this difficulty by spreading the beam power over one line element of the picture or image area on the screen, which may be termed one-dimensional storage, or preferably over the whole picture or image area on the screen, which may be termed two-dimensional storage. Commonly a relatively high velocity scanning beam is employed to create a charge image, and this charge image controls the flow of a flooding beam of electrons to the luminescent screen.

Based on present day television standards, in one-dimensional storage approximately 700–1000 picture elements or spots on the screen may emit light for one line period. In two-dimensional storage, of the order of 300,000 picture elements may emit light over a full frame period. Thus, for a flooding beam power equal to that of the scanning beam in a nonstorage tube, the specific load on the screen may be reduced to $^1/_{1000}$ by one-dimensional storage, and to less than $^1/_{100,000}$ in the case of two-dimensional storage. Thus, with equal beam powers, the storage tube will yield substantially greater screen brightness over a conventional tube, due to improved phosphor efficiency. A much greater gain in brightness may be obtained in practice with a storage tube by increasing the flooding beam power over that just mentioned. This is easily possible since flooding beam cathodes may have a much larger area of emission than conventional nonstorage scanning beam cathodes. With sufficient flooding beam power, lower anode voltages may be employed and still provide much greater light output than in nonstorage tubes. Thus storage tubes offer great advantages in providing brighter images, particularly for projecting images to large screens for viewing by sizable audiences.

A number of attempts have been made to provide satisfactory tube systems operating on the storage principle. Patent No. 2,259,507 to Iams is an example of one type in which a charge image is created on a storage grid by an intensity modulated scanning beam, and the charge image thus created is used to control the flow of flooding electrons to a luminescent screen. Since Iams employs intensity modulation, the scanning beam is able to change the charge on the storage grid in one direction only, thereby requiring resort to leakage between successive scansions of a given elemental area to enable charging the elemental area to different potentials. This is accomplished in Iams by providing sufficient leakage in the charge storage grid. In order to follow rapid changes in brightness, the leakage time constant must be made fairly short, so that it is not possible to obtain full storage between successive scansions. Less bright images accordingly result.

Another storage device is shown in Patent No. 2,355,212 to Farnsworth. Farnsworth shows a one-dimensional type of storage tube in which a linear charge image is produced with a scanning beam of constant intensity by collecting secondary electrons liberated from the storage grid in accordance with image signals to be reproduced. The strogae grid controls the flow of electrons from a linear flooding cathode to a luminescent screen to obtain line storage. With this type of tube, storage can be maintained over a single line, thus obtaining the benefits of one-dimensional storage. However, the much greater benefits of two-dimensional storage are not possible with the device of this patent. Furthermore, one-dimensional storage requires that the line image be deflected in a vertical direction in order to obtain a two-dimensional image. This results in smearing the images of adjacent lines on the luminescent screen, with resultant decrease in detail of the observed picture.

Other types of storage tubes, both one-dimensional and two-dimensional, are shown in British Patent No. 494,145 to Loewe. Figure 5 of this patent shows a two-dimensional storage tube in which a two-dimensional extended cathode is placed close to a charge storage element, and between the charge storage element and the fluorescent screen. In such a structure the control of the flooding electrons by the charge storage element is difficult, and if the incandescent cathode is placed very close to the charge storage element to facilitate control, it is difficult to construct the charge storage element so that heat will not cause charges to be dissipated too rapidly. Furthermore, contamination of the charge storage element by the closely adjacent incandescent cathode appears troublesome.

It is, therefore, a principal object of the present invention to provide a two-dimensional storage cathode-ray system in which the potentials of the charge storage image can be changed in either direction without requiring leakage, to thereby obtain fuller benefit of the storage, and in which the bidimensional storage grid and flooding beam cathode are so constructed and arranged as to provide effective control of the flooding electrons by charge images on the grid, while heating and contamination of the storage grid are minimized.

Broadly, in accordance with the invention a bidimensional foraminous grid of substantial area, having a secondary electron emissive charge storage surface on one side thereof, is employed to control the flow of a flooding beam of substantial cross-sectional area through the grid to an image reproducing target. Charge images are produced on the foraminous grid by scanning the grid in two dimensions with a scanning electron beam to liberate secondary electrons therefrom, and collecting the secondary electrons at potentials varying in accordance with the image signal to be reproduced.

The invention will be more fully understood by reference to the accompanying drawings which illustrate specific embodiments thereof, taken in conjunction with the following description. In the drawings:

Fig. 1 shows a cross section of a storage tube and associated television circuits in accordance with one embodiment of the invention;

Fig. 2 is a cross section of a fragment of the foraminous control grid;

Fig. 3 is a front view of the foraminous grid;

Figure 4:
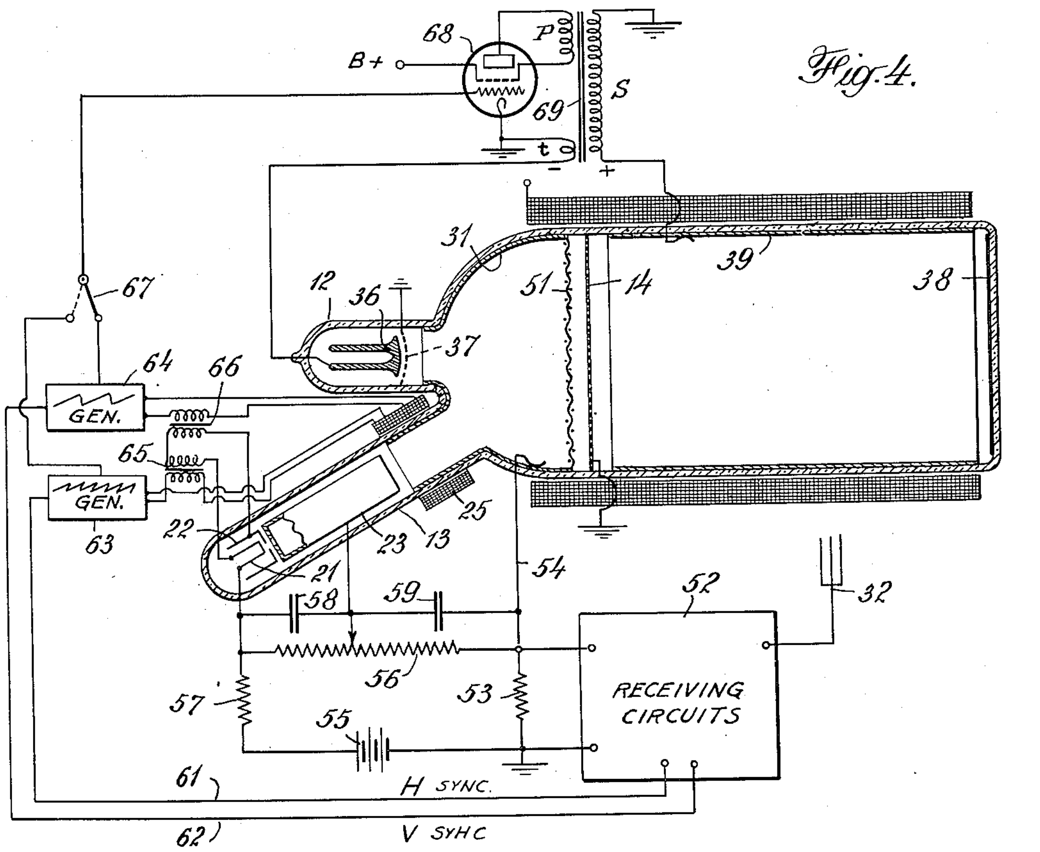
Fig. 4 is another embodiment of the invention providing means for turning the scanning and flooding beams on and off alternately.

Referring now to Fig. 1, an evacuated envelope is shown having a substantially cylindrical body portion 11 with a substantially coaxial arm 12 and a side arm 13 near one end thereof. Extending across the cylindrical body portion 11 intermediate the ends thereof is a bidimensional foraminous grid 14. Grid 14 is shown also in Figs. 2 and 3 and comprises a conductive base 15 of a suitable material such as a very thin metal foil. On one surface of the conductive base is a secondary-electron emissive charge-storage layer 16. The grid contains a myriad of holes or foramina 17 which preferably outnumber the picture elements of the frame to be reproduced so that the definition of the spot pattern of the grid is at least equal to or superior than the desired picture definition. For a grid of the order of 3 inches in diameter, the diameter of the holes may be of the order of tens of microns.

Such foramina may be made by any desired process, for example by photoengraving a thin metal foil. The secondary emissive coating 16 may be of any desired material which has sufficiently high resistance and sufficient secondary electron emissivity. An example of such a material is magnesium oxide, and it could be applied, for example, by exposing the foraminous foil to a stream of magnesium vapor with subsequent oxidation of the magnesium coating in a glow discharge.

It should be noted that it is important that layer 16 have a high resistance in lateral directions to minimize flow of charges from one point to another, which would result in loss of definition. The resistance of layer 16 between the surface thereof and the conductive base 15 may be selected as desired, but is advantageously sufficiently high to avoid substantial leakage between successive scansions of a given elemental area. Thus the time constant between the surface and the base may be substantially longer than the interval between successive scansions of an elemental area, advantageously several times the interval. As has been pointed out, in accordance with the present invention leakage is not necessary for obtaining proper modulation or alteration of the charge image on the grid, and is advantageously avoided, but if desired for any other reason shorter time constants may be employed, with resultant decrease in the storage effect.

Side arm 13 contains a scanning electron beam source designed and positioned to direct a beam of elemental cross section toward the secondary electron emissive side of grid 14. The scanning beam source comprises a cathode 21, control grid 22, first anode 23, second anode 24, and magnetic deflecting coils 25. As shown in the drawing, the second anode 24 is a conductive coating on the inside of side arm 13 and may be grounded as indicated. The first anode, grid and cathode are maintained at potentials negative to ground by suitable taps on the voltage source 26. Control grid 22 is shown as maintained somewhat positive to cathode 21, but it may be maintained somewhat negative if desired. It should be noted that the scanning beam intensity remains substantially constant during scanning, no modulating potentials being applied to the control grid 22.

The scanning beam cathode 21 is maintained several hundred volts below ground to provide a relatively high velocity scanning beam 27 which scans grid 14 and liberates secondary electrons therefrom. The scanning beam is deflected in two dimensions by the deflecting coils 25 energized from the scanning wave generator 28 which provides suitable horizontal and vertical deflecting waves, usually sawtooth in shape. Sequential, interlaced, or any other desired type of scanning pattern may be employed. A collector for the secondary electrons thus emitted is provided in the form of a conductive coating 31 on the inner surface of the cylindrical portion of the tube envelope on the same side of the grid as the scanning beam, that is between the grid 14 and the left end of the tube.

Television signals are received through antenna 32 and supplied to the receiving circuits 33. The video picture signal is supplied through lead 34 to the collector 31 so that the collector potential is modulated in accordance with the received video signal. Suitable line (horizontal) and field (vertical) synchronizing signals are derived from the received television signal and supplied through lead 35 to the scanning wave generator 28.

By varying the potential of the collector 31 during the scanning of grid 14 by scanning beam 27, a bi-dimensional charge image is created on the grid. The potential of the charge of a given elemental area at the instant of scanning bears a substantially fixed relationship to the potential of the collector at that instant. In general, the potential of the elemental area will be below that of the collector at the given instant by an amount which would liberate secondary electrons from the grid with a ratio of unity. As the scanning proceeds, successively scanned elemental areas assume potentials which differ from the video signal at corresponding instants by substantially the same amount. Thus an electrostatic charge image is created on grid 14 which represents the video signal.

At the next scansion of a given elemental area by the scanning beam, the video signal may have changed in either a positive or negative direction. Since the elemental area at the instant of scanning assumes a constant relative potential to the then-existing value of the video signal, the potential of the charge can be varied in either direction. Thus it is unnecessary to provide for leakage between successive scansions to enable a new charge image to be created. The type of modulation employed enables the charge over the grid to be changed from point to point in accordance with new values of the video signal without the existence of leakage between scansions.

In the coaxial arm 12 is provided a source of a relatively low velocity flooding electron beam. This comprises a cathode 36 and grid 37. Flooding electrons from cathode 36 are directed toward the grid 14 in a broad beam of substantial cross-sectional area. Preferably the cross-sectional area of the flooding electron beam will be approximately equal to the area scanned by scanning beam 27. Flooding electrons pass through the foramina of grid 14 under the control of the electrostatic charges thereon and travel toward the fluorescent screen 38 positioned at the end of the cylindrical envelope. The flooding electrons are accelerated between grid 14 and fluorescent screen 38 by the accelerating anode 39, maintained at a suitable high potential by battery 41, and the high potential of screen 38 produced in operation.

As the flooding electrons pass through the foramina of grid 14 they form, in effect, an electron image. The density of electrons varies from point to point in accordance with the charge pattern in grid 14. This electron image may be considered as accelerated toward the fluorescent screen 38 by the accelerating anode 39 and the potential of screen 38, and the electron image is focused on screen 38 by the focusing coil 42 energized from a suitable source of direct current.

It is advantageous that the flooding electron beam be substantially uniform over its cross section at grid 14. This may be accomplished by employing suitable electrostatic or electromagnetic fields, or both. In Fig. 1 use is made of the fact that slow electrons may be made to travel along magnetic lines of force. To this end, a suitable magnetic field is established between the stray field of the main focusing coil 42 and an auxiliary coil 43 wound around the coaxial neck 12 and energized from a suitable source of direct current. Flooding electrons traverse the space between cathode 36 and grid 14 in a beam of widening cross section. Other means of directing the flooding electrons so that they form a substantially uniform beam at grid 14 may be employed as desired.

It should be noted that not only the scanning beam cathode, but also the flooding beam cathode, are substantially removed from grid 14. This greatly assists in preventing heating and contamination of the grid.

In the specific embodiment of Fig. 1 the conductive base of grid 14 is maintained at ground potential and battery 40 maintains the flooding beam cathode 36 negative to ground by an amount insufficient to liberate secondary electrons from grid 14 at a ratio greater than unity. Grid 37 of the flooding beam gun is maintained at ground potential. The range of video potentials applied to collector 31 are advantageously such that the charges created on grid 14 are substantially at or below the potential of the flooding beam cathode 36. In this manner the charge image effectively controls the flow of flooding electrons therethrough and flooding electrons do not tend to impinge on the grid to dissipate the charges thereon. It will be understood that since a relatively high potential of the order of thousands of volts will ordinarily be applied to accelerating anode 39, the electrostatic lines of force will ordinarily tend to pass through the foramina of grid 14. Thus the flooding beam cathode 36, the charge storage grid 14, and the accelerating anode 39 function similarly to that of an ordinary triode vacuum tube.

It should be understood that considerable variations in the potentials applied to the tube are possible. Generally speaking, the potentials of the electrodes forming the flooding beam source will be selected to yield a relatively low velocity electron beam at the charge storage grid 14. The range of video potentials applied to collector 31 will be selected so that the charge image created thereby can effectively control the flow of flooding electrons through the grid to the fluorescent screen.

For illustrative purposes, assume that the conductive base 15 of grid 14 and flooding beam grid 37 are grounded, and that an electron velocity of 20 volts liberates secondary electrons from the grid 14 at unity ratio. With the scanning beam cathode held several hundred volts negative, say −700 volts, secondary electrons will be emitted from grid 14 at a ratio greater than unity. If the video signal applied to collector 31 varies from, say, +10 volts for white to −10 for black, corresponding charge potentials on grid 14 will be of the order of 20 volts lower, or from −10 to −30 volts. If now the flooding beam cathode is held at −10 volts, it will be seen that the portions of grid 14 representing white will be at approximately flooding cathode potential and flooding electrons will pass relatively freely therethrough under the influence of the highly positive accelerating voltage on anode 39. On the other hand, grid elements representing black will be about 20 volts negative to the flooding beam cathode so that flooding electrons will be substantially cut off. For grid potentials between −10 and −30, varying numbers of flooding electrons will pass, thereby producing varying values of grey on the fluorescent screen 38.

Actually the influence of the highly positive accelerating voltage on anode 39 will somewhat modify the simplified action just described, and grid charges somewhat negative to flooding beam cathode may still permit most of the flooding electrons to pass. For a particular tube structure, suitable values of applied potentials and a suitable range of modulating potentials may readily be selected in accordance with the principles described herein. Also, the conductive base of grid 14 and the flooding beam grid 37 may be held at potentials other than ground, and differ from each other, if desired.

While the tube of Fig. 1 shows a fluorescent screen for reproducing visible images, other types of signal-reproducing targets may be employed if desired. In general, the spacial distribution of the electron image will be preserved from the grid to the target, and the target utilized for reproduction of images in any desired manner.

Under certain conditions of operation, or for certain special uses of the tube, it may be undesirable to have the flooding electron beam continuously flowing. It also may be undesirable to have the scanning beam impinge on the grid during the retrace interval. In such event provision may be made for turning the scanning and flooding beams on and off alternately. Advantageously the flooding beam may be turned off during the scanning interval and turned on during the retrace or blanking interval between successive scansions. Likewise the scanning beam may be turned off during the retrace or blanking intervals. The system of Fig. 4 illustrates certain ways in which this may be accomplished.

In Fig. 4 the tube itself has been shown in slightly modified form to illustrate some possible variations. As shown here, the collector 31 is connected to a coarse conductive screen 51 which is parallel to the charge storage grid 14 and substantially coextensive therewith. This is useful in providing a somewhat more uniform collecting of secondary electrons for all points of grid 14. Grid 51 is preferably formed of small wires relatively widely spaced so as not to substantially impair or interfere with the flow of either the scanning beam or the flooding beam.

The received television signal is supplied from antenna 32 to receiving circuits 52 which supply the video to the resistive load 53. One terminal of resistor 53 is grounded and the other connected to the collector 31 through lead 54, thereby supplying the video thereto.

It should be noted that collector 31 extends into the neck of side arm 13 to serve as second anode for the scanning beam gun. Battery 55 energizes the potentiometer 56 through the load resistor 53 and an additional resistor 57. Potentials for the scanning beam cathode 21 and first anode 23 are obtained from potentiometer 56. By-pass capacitors 58 are provided to keep the relative potentials applied to the scanning beam gun substantially constant throughout a cycle of operation. At the same time, however, the gun potentials as a whole are shifted up and down in accordance with the video output of 52. In general the impedance of resistors 53 and 57 in parallel is large compared to the output impedance of 52, so that the video is properly supplied to collector 31. By varying the potentials of the collector and the electrodes of the scanning electron gun in accordance with the image signal during the scanning, while maintaining the relative potentials of collector and electrodes constant, the maintaining of a constant intensity of the scanning beam is facilitated.

Suitable horizontal and vertical synchronizing signals are supplied from receiving circuits 52 through leads 61 and 62 to the horizontal sawtooth wave generator 63 and vertical sawtooth wave generator 64, respectively. The outputs of generators 63 and 64 are supplied to the deflecting yoke 25. In the output circuits are inserted primaries of transformers 65 and 66, respectively. The secondaries of the transformers are connected in series and the terminals connected to the cathode 21 and control grid 22. The functioning of these transformers will be described shortly in connection with Fig. 5.

The outputs of generators 63 and 64 are also supplied to terminals of switch 67, through which either output may be supplied to the grid of tube 68. The output load of tube 68 is the primary winding *p* of transformer 69. The secondary winding *s* is a high voltage winding connected between ground and the accelerating anode 39. A tertiary winding *t* is connected from ground to the cathode 36 of the flooding electron beam source. Tube 68 is shown as a tetrode with the screen grid connected to the B+ supply, and the plate connected to B+ through winding *p*.

Figure 5:
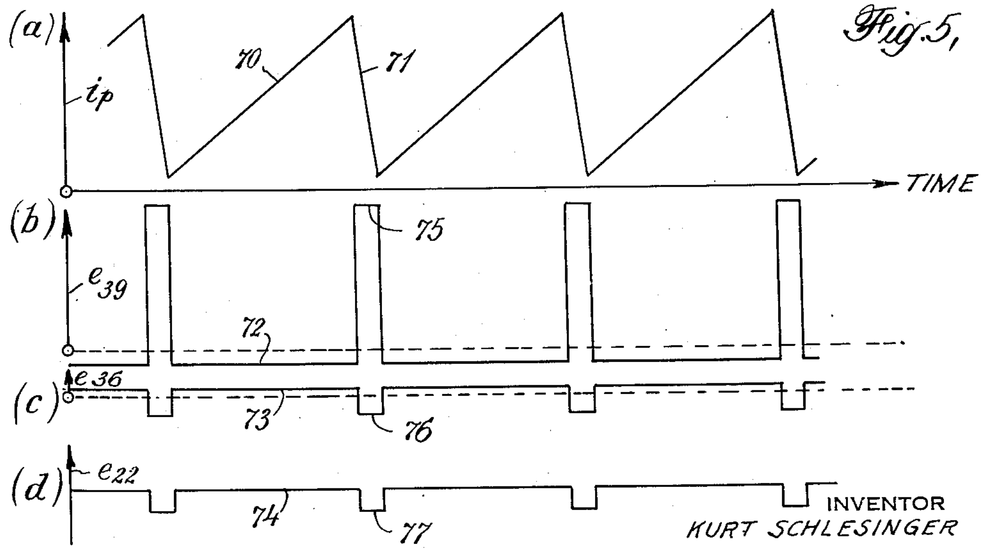
Fig. 5 shows certain wave forms pertaining to the embodiment of Fig. 4.

The operation will be understood more easily from Fig. 5. In Fig. 5*a* a sawtooth wave is shown which is assumed for the moment to be the low frequency vertical sawtooth wave supplied from generator 64. During the relatively slow rise 70 of this wave the current in winding *p* of the transformer 69 will increase slowly and a relatively small voltage will be developed in the secondary and tertiary windings of the transformer. The polarities of these windings are such that accelerating anode 39 is at a somewhat negative potential to ground, as shown at 72 in Fig. 5*b*. The polarity of the tertiary winding *t* is selected to maintain the flooding beam cathode 36 somewhat positive to ground, as shown at 73 in Fig. 5*c*. Thus the flooding beam will be cut off and the accelerating anode potential somewhat negative so that no picture will appear on screen 38. At the same time the polarities of the secondary windings of transformers 65 and 66 are such that the grid 22 is positive to the cathode 21, as shown at 74 in Fig. 5*d*. It will be understood that this is the potential applied between the grid and cathode by transformer 66.

During the flyback 71 the current through primary *p* of transformer 69 changes much more rapidly and in the opposite direction and induces a high voltage of opposite polarity in the secondary winding, thereby impressing a high positive voltage on the accelerating anode 39, as shown by the pulse 75 in Fig. 5*b*. At the same time, the cathode 36 is driven negative, as shown at 76 of Fig. 5*c*, so that the flooding electron beam is turned on and those flooding electrons passing through the grid 14 are accelerated to screen 38 and produce an image thereat. At the same time grid 22 of the scanning beam is driven negative to cathode 21, as shown at 77 of Fig. 5*d*, so that the scanning beam is shut off. This is the desired operation.

The effect of transformer 65 during the above described operation is to turn the scanning beam on during the scanning of each line and off during the retrace or blanking interval between successive lines. This operation will be understood from the above description.

It would be possible to have the scanning beam and broad beam alternate at line scanning frequency by changing switch 67 to the dotted position so that the output of the line scanning generator 63 is supplied to tube 68. The operation in such event will be apparent in view of the foregoing description and will not be repeated.

The circuit of Fig. 4 provides for switching potentials in the system at a number of points, in order to obtain complete segregation of scanning and flooding-reproduction operations. If desired, of course, switching the potentials of fewer points may be employed.

Many detailed circuits may be devised for turning the scanning and flooding beams on and off alternately. The advantage of such an operation is that neither beam can interfere with the operation of the other. There is no danger of flooding electrons discharging the charge image during the scanning operation. Furthermore, by removing or substantially reducing the accelerating potential applied to the accelerating anode 39 when the scanning beam is on, the production of light at screen 38 by the scanning beam is prevented or substantially reduced, thereby avoiding visible flashes or reduction of the contrast of the reproduced images. Also, the potential relationships of the tube during scanning and flooding operations are not as intimately related as before, so that additional flexibility is attained. For example, the potential of the conductive base 15 of the storage grid may be maintained at different constant values during the scanning and flooding operations.

The operation has the disadvantage that only a fraction of the full storage time is now available. Assuming the vertical blanking to be ten percent of the interval between vertical scansions, only ten percent of the full storage time is utilized. This may be entirely sufficient, however, in many circumstances. If required, greater flooding cathode currents or higher accelerating anode voltages may be employed to at least partially compensate for the lost storage time, since the luminescent screen will be able to cool between flooding intervals.

Since in the flashing operation just described the scanning and flooding beams are on alternatively, it is possible to employ only a single electron gun structure. In such case provision can be made to sharply focus the electron beam and to apply a relatively high accelerating potential during the scanning operation. For the flooding operation, the beam can then be defocused and the acceleration reduced to a low value. The operating principles for such a modification are the same as for the two electron gun structure illustrated and will be clear to those in the art.

Although the invention has been especially described in connection with a television system, it will be apparent that it is generally useful for the reproduction of image signals of widely different types, such as in oscilloscopes, radar, etc.

It will now be appreciated that the applicant has provided a storage type of receiver tube system which has considerable advantages over those previously disclosed. Many variations in detailed structure, and in the potential relationships selected, are possible within the scope of the invention as described and as particularly pointed out in the following claims.

I claim:

1. In a cathode-ray tube system for reproducing image signals, the combination which comprises a bidimensional foraminous grid of substantial area having a secondary-electron emissive charge-storage surface on one side thereof, a source of a scanning electron beam positioned to direct the beam toward said one side of the grid, deflection means for deflecting the scanning beam in two dimensions to scan an area of the grid, a collector positioned to collect secondary electrons liberated from said grid by the scanning beam, circuit connections for modulating the potential of said collector in accordance with an image signal to produce a charge image on said grid, a source of a low velocity flooding electron beam positioned and adapted to direct electrons to said grid in a broad beam of substantial cross-sectional area, and target means for utilizing flooding electrons passing through said grid under the control of the charge image thereon to produce an image.

2. In a cathode-ray tube system for reproducing image signals, the combination which comprises a bidimensional foraminous grid of substantial area having a secondary-electron emissive charge-storage surface on one side thereof, electron gun means for generating a relatively high velocity scanning electron beam and a relatively low velocity flooding electron beam and directing said beams toward said one side of the grid, said scanning beam being of elemental cross-sectional area and said flooding beam being of substantial cross-sectional area at said grid, deflection means for deflecting the scanning beam in two dimensions to scan an area of the grid and liberate secondary electrons therefrom, a collector positioned to collect secondary electrons from said grid, circuit connections for modulating the potential of said collector in accordance with an image signal to produce a charge image on said grid, and target means for utilizing flooding electrons passing through said grid under the control of the charge image thereon to produce an image.

3. In a cathode-ray tube system for reproducing image signals, the combination which comprises a bidimensional foraminous grid of substantial area having a high resistance secondary-electron emissive charge-storage surface on one side thereof, electron gun means for generating a relatively high velocity scanning electron beam and a relatively low velocity flooding electron beam and directing said beams toward said one side of the grid, said scanning beam being of elemental cross-sectional area and said flooding beam being of substantial cross-sectional area at said grid, deflection means for repeatedly deflecting the scanning beam in two dimensions to scan repeatedly an area of the grid and liberate secondary electrons therefrom, a collector positioned to collect secondary electrons from said grid, circuit connections for modulating the potential of said collector in accordance with an image signal to produce a charge image on said grid, the resistance of said charge-storage surface being sufficiently high to avoid substantial leakage of charges between successive scansions of the grid, and target means for utilizing flooding electrons passing through said grid under the control of the charge image thereon to produce an image.

4. In a cathode-ray tube system for reproducing image signals, the combination which comprises a bidimensional foraminous grid of substantial area having a conductive base and a secondary-electron emissive charge-storage layer on one side thereof, said layer being of sufficiently high resistance to provide a time constant between the surface thereof and the conductive base which is substantially longer than the interval between successive scannings of an elemental area thereof, a source of a relatively high velocity scanning electron beam of substantially constant intensity and elemental cross-section positioned to direct the beam toward said one side of the grid to liberate secondary electrons therefrom, deflection means for repeatedly deflecting the scanning beam in two dimensions to scan repeatedly an area of the grid, a collector positioned to collect secondary electrons from said grid, circuit connections for modulating the potential of said collector in accordance with an image signal to produce a charge image on said grid, a source of a relatively low velocity flooding electron beam positioned and adapted to direct flooding electrons to said grid from said one side in a broad beam of substantial cross-sectional area, and target means for utilizing flooding electrons passing through said grid under the control of the charge image thereon to produce an image.

5. In a cathode-ray tube system for reproducing image signals, the combination which comprises a bidimensional foraminous grid of substantial area having a conductive base and a secondary-electron emissive charge-storage resistive layer on one side thereof, the time constant between the surface of the layer and the base being substantially longer than the interval between successive scannings of an elemental area thereof, a source of a relatively high velocity scanning electron beam of substantially constant intensity and elemental cross-section positioned to direct the beam toward said one side of the grid to liberate secondary electrons therefrom, deflection means for repeatedly deflecting the scanning beam in two dimensions to scan repeatedly an area of the grid, a collector positioned to collect secondary electrons from said grid, circuit connections for modulating the potential of said collector in accordance with an image signal to produce a charge image on said grid, a source of a relatively low velocity flooding electron beam positioned and adapted to direct flooding electrons to said grid from said one side in a broad beam of cross-sectional area comparable to the scanned area of the grid, a target for reproducing visible images positioned on the other side of the grid to receive flooding electrons passing through the grid under the control of the charge image thereon, and accelerating and focusing means positioned to direct the bidimensional electron image formed by flooding electrons passing the grid onto said target.

6. In a cathode-ray tube system for reproducing image signals, the combination which comprises a bidimensional foraminous grid of substantial area having a conductive base and a secondary-electron emissive charge-storage layer on one side thereof, a source of a relatively high velocity scanning electron beam of substantially constant intensity during scanning positioned to direct the beam toward said one side of the grid to liberate secondary electrons therefrom, deflection means for deflecting the scanning beam in two dimensions to scan an area of the grid, a collector positioned to collect secondary electrons from the grid, a source of a relatively low velocity flooding electron beam including a cathode and positioned to direct flooding electrons to said grid from said one side in a broad beam of substantial cross-sectional area, circuit connections for maintaining the potential of the conductive base of said grid substantially constant during the scanning thereof and during the flooding thereof, circuit connections for applying image-signal modulating potentials to said collector during said scanning to produce a charge image on said grid, the range of modulating potentials being selected so that the potentials of the corresponding grid charges are substantially at or below the potential of the flooding beam cathode, a target for reproducing visible images positioned on the other side of the grid to receive flooding electrons passing through the grid under the control of the charge image thereon, and accelerating and focusing means positioned to direct the electron image formed by flooding electrons passing the grid onto said target.

7. In a cathode-ray tube system for reproducing image signals, the combination which comprises a bidimensional foraminous grid of substantial area having a conductive base and a secondary-electron emissive charge-storage layer on one side thereof, circuit conections for maintaining said conductive base at a substantially fixed potential, a source of a relatively high velocity scanning electron beam of substantially constant intensity during scanning positioned to direct the beam toward said one side of the grid to liberate secondary electrons therefrom, deflection means for deflecting the scanning beam in two dimensions to scan an area of the grid, a collector positioned to collect secondary electrons from the grid, a source of a relatively low velocity flooding electron beam including a cathode and positioned to direct flooding electrons to said grid from said one side in a broad beam of cross-sectional area comparable to the scanned area of the grid, the potential of said cathode relative to the grid base being insufficient to liberate secondary electrons at a ratio greater than unity, circuit connections for applying image-signal modulating potentials to said collector during said scanning to produce a charge image on said grid, the range of modulating potentials being selected so that the potentials of the corresponding grid charges are substantially at or below the potential of the flooding beam cathode, a target for reproducing visible images positioned on the other side of the grid to receive flooding electrons passing through the grid under the control of the charge image thereon, and accelerating and focusing means positioned to direct the electron image formed by flooding electrons passing the grid onto said target.

8. In a cathode-ray tube system for reproducing image signals, the combination which comprises a bidimensional foraminous grid of substantial area having a conductive base and a secondary-electron emissive charge-storage resistive layer on one side thereof, the time constant between the surface of the layer and the base being substantially longer than the interval between successive scannings of an elemental area thereof, a source of a relatively high velocity scanning electron beam of substantially constant intensity and elemental cross-section positioned to direct the beam toward said one side of the grid to liberate secondary electrons therefrom, deflection means for repeatedly deflecting the scanning beam in two dimensions to scan repeatedly an area of the grid, a collector positioned to collect secondary electrons from said grid, a source of a relatively low velocity flooding electron beam including a cathode and positioned to direct flooding electrons to said grid from said one side in a broad beam of cross-sectional area comparable to the scanned area of the grid, the potential of said cathode being negative to the grid base during reproduction of visible images by an amount insufficient to liberate secondary electrons from the grid at a ratio greater than unity, circuit connections for applying image signal modulating potentials to said collector during said scanning to produce a charge image on the grid, the range of modulating potentials being selected so that the potentials of the corresponding grid charges are substantially at or below the potential of the flooding beam cathode, a target for reproducing visible images positioned on the other side of the grid to receive flooding electrons passing through the grid under the control of the charge image thereon, and accelerating and focusing means positioned to direct the electron image formed by flooding electrons passing the grid onto said target.

9. In a cathode-ray tube system for reproducing image signals, the combination which comprises a bidimensional foraminous grid of substantial area having a secondary-electron emissive charge-storage surface on one side thereof, a source of a scanning electron beam including electrodes forming an electron gun structure and positioned to direct the beam toward said one side of the grid, deflection means for deflecting the scanning beam in two dimensions to scan an area of the grid, circuit connections for maintaining the electrodes of the scanning electron gun at substantially constant relative potentials during said scanning, a collector positioned to collect secondary electrons liberated from said grid by the scanning beam, circuit connections for applying image-signal modulating potentials to said collector and to the electrodes of the scanning electron gun during said scanning to thereby produce a charge image on said grid, a source of a low velocity flooding electron beam positioned and adapted to direct electrons to said grid in a broad beam of substantial cross-sectional area, and a target for utilizing flooding electrons passing through said grid under the control of the charge image thereon to produce an image.

10. In a cathode-ray tube system for reproducing image signals, the combination which comprises a bidimensional foraminous grid of substantial area having a conductive base and a secondary-electron emissive charge-storage layer on one side thereof, a source of a relatively high velocity scanning electron beam including electrodes forming an electron gun structure and positioned to direct the beam toward said one side of the grid to liberate secondary electrons therefrom, deflection means for deflecting the scanning beam in two dimensions to scan an area of the grid, a collector positioned to collect secondary electrons from the grid, a source of a relatively low velocity flooding electron beam including a cathode and positioned to direct flooding electrons to said grid from said one side in a broad beam of substantial cross-sectional area, circuit connections for maintaining the potential of the conductive base of said grid substantially constant during the scanning thereof and during the flooding thereof, circuit connections for applying image signal modulating potentials to said collector and to the electrodes of the scanning electron gun during said scanning while maintaining the relative potentials thereof substantially constant, to thereby produce a charge image on said grid, the range of collector potentials being selected so that the potentials of the corresponding grid charges are substantially at or below the potential of the flooding beam cathode, a target for reproducing visible images positioned on the other side of the grid to receive flooding electrons passing through the grid under the control of the charge image thereon, and accelerating and focusing means positioned to direct the electron image formed by flooding electrons passing the grid onto said target.

11. In a cathode-ray tube system for reproducing image signals, the combination which comprises a bidimensional foraminous grid of substantial area having a conductive base and a secondary-electron emissive charge-storage resistive layer on one side thereof, the time constant between the surface of the layer and the base being substantially longer than the interval between successive scannings of an elemental area thereof, a source of a relatively high velocity scanning electron beam of substantially constant intensity and elemental cross-section positioned to direct the beam toward said one side of the grid to liberate secondary electrons therefrom, deflection means for repeatedly deflecting the scanning beam in two dimensions to scan repeatedly an area of the grid, a collector positioned to collect secondary electrons from said grid, circuit connections for applying image signal modulating potentials to said collector to produce a charge image on said grid, a source of a relatively low velocity flooding electron beam positioned and adapted to direct flooding electrons to said grid from said one side in a broad beam of cross-sectional area comparable to the scanned area of the grid, a target for reproducing visible images positioned on the other side of the grid to receive flooding electrons passing through the grid under the control of the charge image thereon, accelerating electrode means positioned to accelerate flooding electrons from said grid onto said target and focusing means positioned to focus the flooding electrons thereon, circuit connections for turning said scanning and flooding beams on during respective alternate intervals, and circuit connections for applying an accelerating potential to said accelerating electrode means during the intervals said flooding beam is on and substantially removing the accelerating potential during the intervals the scanning beam is on.

12. In a cathode-ray tube system for reproducing image signals, the combination which comprises a bidimensional foraminous grid of substantial area having a secondary-electron emissive charge-storage surface on one side thereof, a source of a scanning electron beam positioned to direct the beam toward said one side of the grid, deflection means for deflecting the scanning beam in two dimensions to scan an area of the grid, a collector positioned to collect secondary electrons liberated from said grid by the scanning beam. circuit connections for applying image signal modulating potentials to said collector to produce a charge image on said grid, a source of a low velocity flooding electron beam positioned and adapted to direct electrons to said grid in a broad beam of substantial cross-sectional area, a target for reproducing visible images positioned to receive flooding electrons passing through the grid under the control of the charge image thereon, accelerating electrode means positioned to accelerate flooding electrons from said grid onto said target and focusing means positioned to focus the flooding electrons thereon, circuit connections for turning said scanning and flooding beams on during respective alternate intervals, and circuit connections for applying an accelerating potential to said accelerating electrode means during the intervals said flooding beam is on and substantially reducing the accelerating potential during the intervals the scanning beam is on.

13. In a cathode-ray tube system for reproducing image signals, the combination which comprises a bidimensional foraminous grid of substantial area having a secondary-electron emissive charge-storage surface on one side thereof, means including a source of a scanning electron beam for creating a charge image on said grid, said source being positioned to direct the scanning beam toward said one side of the grid, deflection means for deflecting the scanning beam in two dimensions to scan an area of the grid, a source of a low velocity flooding electron beam positioned and adapted to direct electrons to said grid in a broad beam of substantial cross-sectional area, a target for reproducing visible images positioned to receive flooding electrons passing through the grid under the control of the charge image thereon, accelerating electrode means positioned to accelerate flooding electrons from said grid onto said target and focusing means positioned to focus the flooding electrons thereon, circuit connections for turning said scanning and flooding beams on during respective alternate intervals, and circuit connections for applying an accelerating potential to said accelerating electrode means during the intervals said flooding beam is on and substantially reducing the accelerating potential during the intervals the scanning beam is on.

14. A storage cathode-ray tube for reproducing images from an image signal which comprises a bidimensional foraminous grid of substantial area having a secondary-electron emissive charge-storage surface on one side thereof, a scanning electron beam source positioned to direct the beam toward said one side of the grid and arranged for deflection of the beam in two dimensions to scan an area of the grid, a collector positioned to collect secondary electrons liberated from said grid by the scanning beam, circuit connections for applying the image signal to said collector to vary the potential thereof, whereby a charge image may be produced on said grid, a low velocity flooding electron beam source positioned to direct electrons to said grid in a broad beam of substantial cross-sectional area, and a target for producing visible images positioned to receive flooding electrons passing through said grid under the control of a charge image created thereon.

15. A storage cathode-ray tube for reproducing images from an image signal which comprises a bidimensional foraminous grid of substantial area having a secondary-electron emissive charge-storage surface on one side thereof, a relatively high velocity scanning electron beam source positioned to direct the beam toward said one side of the grid and liberate secondary electrons therefrom, said source being arranged for deflection of the beam in two dimensions to scan an area of the grid, a collector positioned to collect secondary electrons from the grid, circuit connections for applying the image signal to said collector to vary the potential thereof, whereby a charge image may be produced on said grid, a relatively low velocity flooding electron beam source positioned to direct electrons toward said one side of the grid in a broad beam of substantial cross-sectional area, a target for producing visible images positioned to receive flooding electrons passing through said grid under the control of a charge image created thereon, and accelerating electrode means positioned to accelerate flooding electrons between said grid and target.

16. A storage cathode-ray tube for reproducing images from an image signal which comprises a bidimensional foraminous grid of substantial area having a conductive base and a high-resistance secondary-electron emissive charge-storage layer on one side thereof, a relatively high velocity substantially constant intensity scanning electron beam source positioned to direct the beam toward said one side of the grid and liberate secondary electrons therefrom, said source being arranged for deflection of the beam in two dimensions to scan an area of the grid, a conductive collector positioned on said one side of the grid to collect secondary electrons therefrom, circuit connections for applying the image signal to said collector to vary the potential thereof, whereby a charge image may be produced on said grid, a relatively low velocity flooding electron beam source positioned to direct electrons toward said one side of the grid in a broad beam of substantial cross-sectional area, an accelerating anode and a target for producing visible images positioned on the other side of said grid, flooding electrons passing through the grid under the control of a charge image thereon to form an electron image, and focusing means positioned to focus said electron image onto said target.

17. A storage cathode-ray tube for reproducing images from an image signal which comprises an evacuated envelope having a substantially cylindrical body portion and a side arm near one end thereof and at an angle thereto, a bidimensional foraminous grid extending across the cylindrical body portion intermediate the ends thereof, said grid having a conductive base and a high-resistance secondary-electron emissive charge-storage layer on one side thereof toward said one end, a relatively high velocity substantially constant intensity scanning electron beam source positioned in said side arm, said source being arranged for deflection of the beam in two dimensions to scan an area of the grid and liberate secondary electrons therefrom, a conductive collector positioned within said envelope on said one side of the grid to collect secondary electrons liberated therefrom, circuit connections for applying the image signal to said collector to vary the potential thereof, whereby a charge image may be produced on said grid, a relatively low velocity flooding electron beam source positioned on said one side of the grid substantially coaxial with said cylindrical body portion for directing flooding electrons to said grid in a broad beam of substantial cross-sectional area, a luminescent target screen positioned at the other end of said cylindrical body portion and an accelerating anode positioned to accelerate flooding electrons from the grid to the screen, flooding electrons passing through the grid under the control of a charge image thereon to form an electron image, and focusing means positioned to focus said electron image onto said target.

18. The method of producing an image from an image signal which comprises producing a broad flooding beam of relatively low velocity electrons having a substantial cross-sectional area, directing said flooding beam toward an image reproducing surface, controlling the flow of flooding electrons to said surface by a bidimensional charge image of substantial area interposed in the path thereof, producing a relatively high velocity scanning electron beam of elemental cross-section and directing the beam toward said charge image from the same side toward which the flooding beam is directed, traversing the charge image with the scanning beam in two dimensions to scan an area thereof and liberate secondary electrons, collecting said secondary electrons at potentials varying in accordance with the image signal during said scanning to vary said charge image, and focusing onto said image reproducing surface the two-dimensional electron image formed by the flooding electrons passing through said charge image.

19. The method of producing an image from an image signal which comprises producing a broad flooding beam of relatively low velocity electrons having a substantial cross-sectional area, directing said flooding beam toward an image reproducing surface, controlling the flow of flooding electrons to said surface by a bidimensional charge image of substantial area interposed in the path thereof, producing a relatively high velocity scanning electron beam of elemental cross-section and directing the beam toward said charge image from the same side toward which the flooding beam is directed, traversing the charge image with the scanning beam in two dimensions to scan an area thereof and liberate secondary electrons, collecting said secondary electrons at potentials varying in accordance with the image signal during said scanning to vary said charge image, the range of said potentials being selected to yield charge image potentials which are at or below the potential of the source of flooding electrons, and accelerating and focusing onto said image reproducing surface the two-dimensional electron image formed by the flooding electrons passing through said charge image.

KURT SCHLESINGER.

REFERENCES CITED

The following references are of record in the file of this patent:

UNITED STATES PATENTS

| Number | Name | Date |
|---|---|---|
| 2,259,507 | Iams | Oct. 21, 1941 |
| 2,280,191 | Hergenrother | Apr. 21, 1942 |
| 2,355,212 | Farnsworth | Aug. 8, 1944 |